United States Patent
Nguyen et al.

(10) Patent No.: US 11,339,646 B2
(45) Date of Patent: May 24, 2022

(54) ITERATIVE BOREHOLE SHAPE ESTIMATION OF CAST TOOL

(71) Applicant: Halliburton Energy Services, Inc., Houston, TX (US)

(72) Inventors: Nam Nguyen, Singapore (SG); David Orlando Torres, Bastrop, TX (US); Gary Wayne Kainer, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 280 days.

(21) Appl. No.: 16/494,111

(22) PCT Filed: Nov. 2, 2018

(86) PCT No.: PCT/US2018/059052
§ 371 (c)(1),
(2) Date: Sep. 13, 2019

(87) PCT Pub. No.: WO2020/091814
PCT Pub. Date: May 7, 2020

(65) Prior Publication Data
US 2021/0079786 A1 Mar. 18, 2021

(51) Int. Cl.
*E21B 47/085* (2012.01)
*G01V 1/50* (2006.01)

(52) U.S. Cl.
CPC .............. *E21B 47/085* (2020.05); *G01V 1/50* (2013.01)

(58) Field of Classification Search
CPC ........... E21B 47/085; G01V 1/05; G01V 1/50
See application file for complete search history.

(56) References Cited

U.S. PATENT DOCUMENTS

| 5,737,277 A | 4/1998 | Priest |
| 6,065,219 A | 5/2000 | Murphey et al. |

(Continued)

FOREIGN PATENT DOCUMENTS

| WO | WO-0000786 A1 * | 1/2000 | ............. E21B 44/00 |
| WO | WO-0000845 A1 * | 1/2000 | ............ E21B 47/085 |

(Continued)

OTHER PUBLICATIONS

ISRWO International Search Report and Written Opinion for PCT/US2018/059052 dated Jul. 26, 2019.

(Continued)

*Primary Examiner* — Ian J Lobo
(74) *Attorney, Agent, or Firm* — John Wustenberg; C. Tumey Law Group PLLC

(57) ABSTRACT

A method for identifying a shape of a borehole may comprise disposing a downhole tool into the borehole, wherein the downhole tool comprises at least one transducer, transmitting a pressure pulse from the at least one transducer, wherein the pressure pulse is reflected as an echo, recording the echo with the at least one transducer, producing data points based at least in part on the echo, each data point including a radial distance value and an azimuthal value corresponding to the radial distance value, performing a pre-selection, fitting a geometric shape to a plurality of data points within the borehole, and sorting out at least one of the plurality of data points based at least in part on the shape. A system for identifying shape of a borehole may comprise at least one transducer and an information handling system.

20 Claims, 11 Drawing Sheets

(56) References Cited

U.S. PATENT DOCUMENTS

| 7,260,477 B2 | 8/2007 | Haugland |
| 2009/0114472 A1* | 5/2009 | Winkler ................ E21B 47/085 |
| | | 181/105 |
| 2013/0030705 A1 | 1/2013 | Pei et al. |
| 2017/0322332 A1 | 11/2017 | Cooper et al. |
| 2019/0339411 A1* | 11/2019 | Dollfus .................... G01V 1/50 |
| 2020/0116005 A1* | 4/2020 | Li ........................... E21B 47/09 |
| 2020/0116012 A1* | 4/2020 | Chang .................... E21B 47/01 |

FOREIGN PATENT DOCUMENTS

| WO | 2009117236 | 9/2009 |
| WO | 2018038712 | 3/2018 |

OTHER PUBLICATIONS

Schlumberger, Borehole Properties Analysis, Environmental Measurement Sonde, Jul. 2002.
Halliburton, Oil Mud Reservoir Imager ((OMRI™) Tool, Superior Borehole Images in Oil-Based Muds, H05346, Feb. 2016.
Circumferential Acoustic Scanning Tool-InSite® (CAST-I™) Service, Halliburton 2016.

* cited by examiner

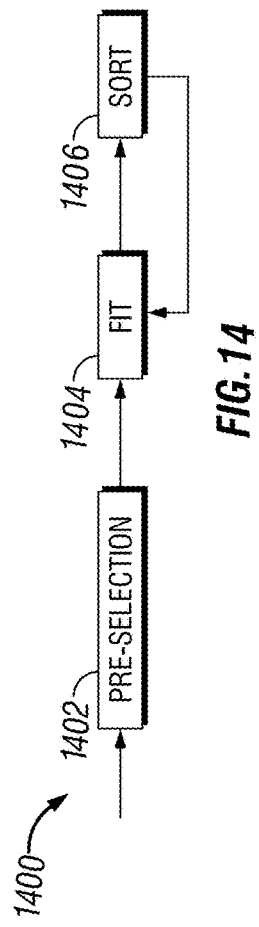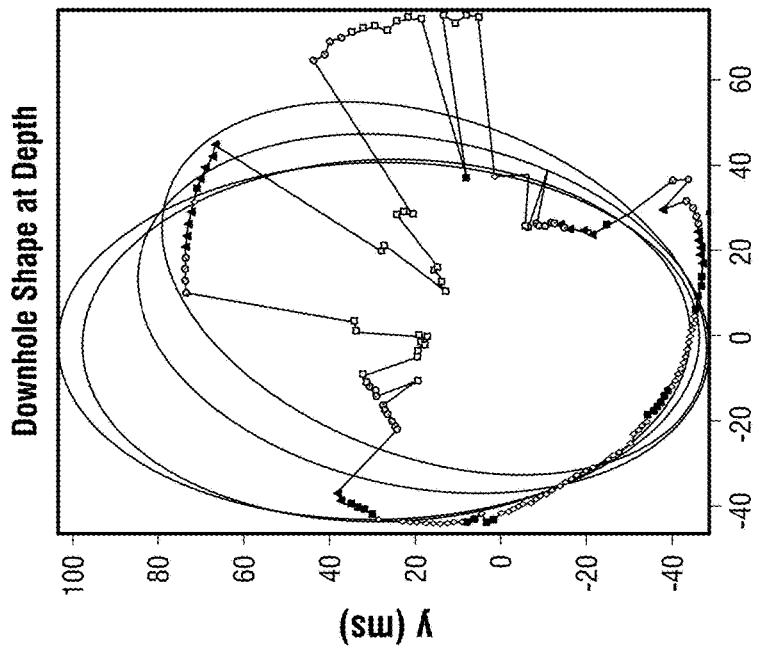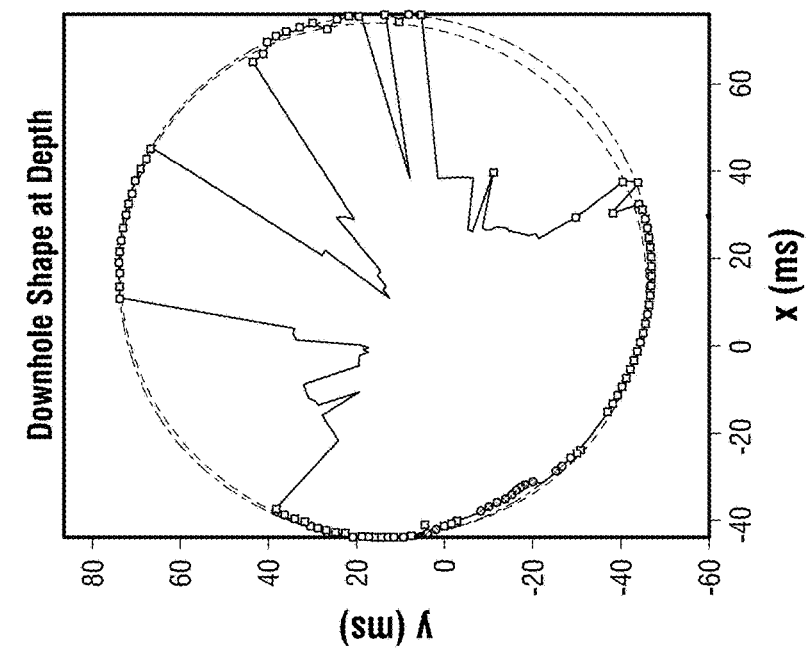
FIG. 14
FIG. 15
FIG. 16

ITERATIVE BOREHOLE SHAPE ESTIMATION OF CAST TOOL

BACKGROUND

Wellbores drilled into subterranean formations may enable recovery of desirable fluids (e.g., hydrocarbons) using any number of different techniques. Currently, drilling operations may identify subterranean formations through a bottom hole assembly if the subterranean formation is disposed horizontal to the bottom hole assembly. In measurement operations, a measurement assembly may operate and/or function to determine the shape of a borehole. During measurement operations it may be important to determine a borehole shape to enable many different borehole analysis algorithms. The Circumferential Acoustic Scanning Tool (CAST) characterizes the borehole shape by azimuthally emitting acoustic pulses and measuring the travel time of the reflected signal. However, the measurements may be distorted due to noise or heavy debris or weighting material suspended in the mud. Currently, the typical ovality algorithm that best-fit the measurements into an elliptical shape may try to fit to the distorted measurements and fail to provide accurate borehole shape.

Existing methods for calculating borehole shape usually have more or less pre-assumptions of the borehole geometry. Either boreholes are assumed in one specific type of geometry (e.g., ellipse) or portion of boreholes is assumed remaining circular shapes, which largely limits the effectiveness on more complex scenarios such as irregular boreholes. A method that may operate without any pre-knowledge or pre-assumption, to determine the shape of a borehole geometry may be beneficial.

BRIEF DESCRIPTION OF THE DRAWINGS

These drawings illustrate certain aspects of some examples of the present disclosure, and should not be used to limit or define the disclosure.

FIG. 14 is a workflow for a pre-selection before the fit-and-sort loop;

FIG. 15 is a graph estimation of a borehole with the pre-selection;

FIG. 16 is a graph estimation of a borehole without the pre-selection; and

DETAILED DESCRIPTION

This disclosure may generally relate to a system and method of a bottom hole assembly measurement system configured to calculate borehole shapes. The system includes multiple ultrasonic transducers or transducer/receivers to measure the tool location with respect to a borehole wall.

As discussed below, systems and methods are proposed that may be highly robust to distorted measurement in estimating borehole shapes. The systems and methods may comprise a pre-sorting step and an iterative loop between fitting and sorting. In the pre-sorting step, the heavily distorted measurements may be detected and sorted out. The fit-and-sort step may execute an iterative loop of fitting an ellipse on the selected measurements then sorting further outliner measurements based on the updated ellipse. The outcome of this process may be a borehole shape that fit tightly on measurements of the borehole wall while avoiding distorted measurements of the borehole wall.

Figure 1:
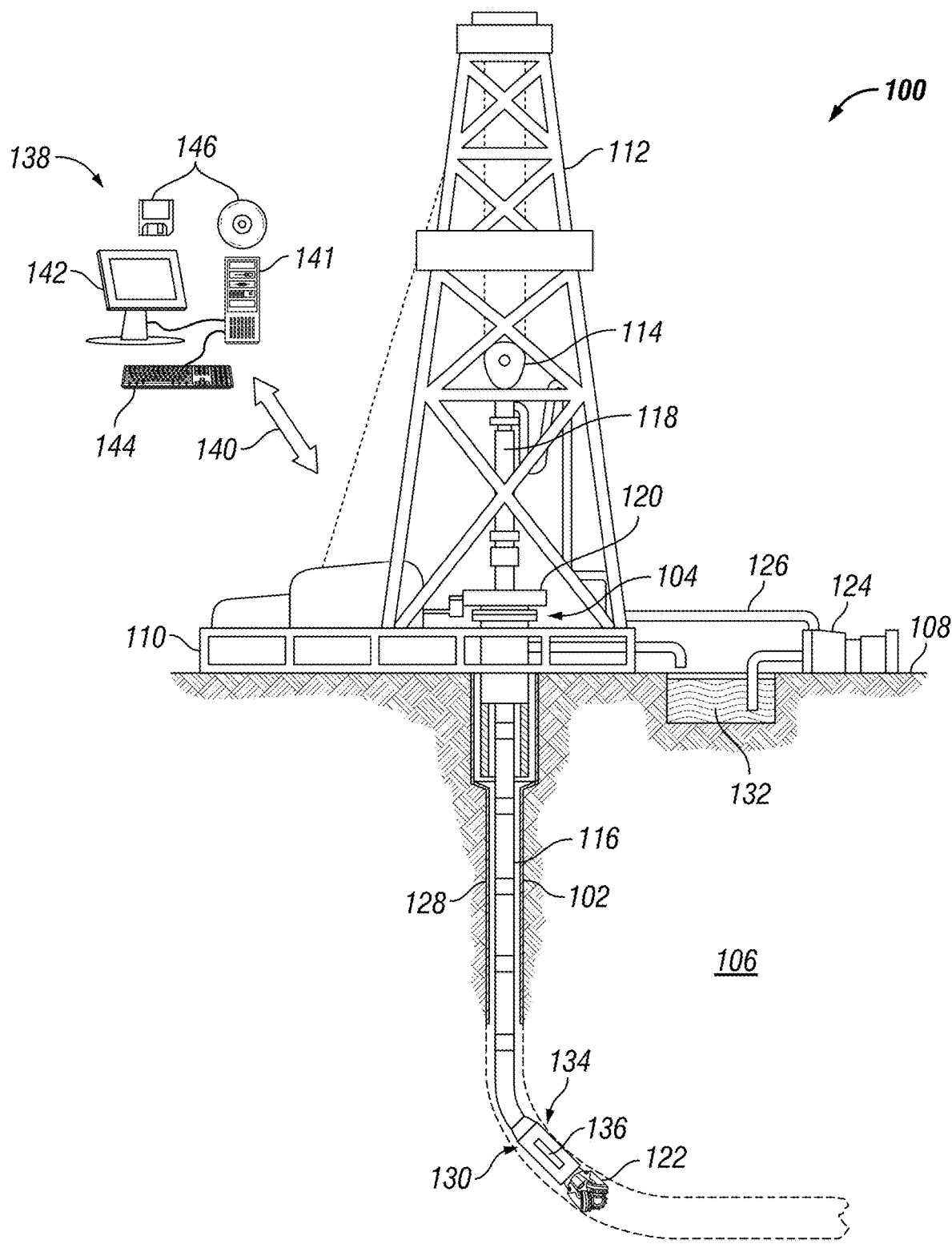
FIG. 1 illustrates an example of a drilling system.

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly (BHA) 130 at distal end of drill string 116. BHA 130 may further include tools for look-ahead resistivity applications. As will be appreciated by those of ordinary skill in the art, BHA 130 may be a measurement-while drilling (MWD) or logging-while-drilling (LWD) system.

BHA 130 may comprise any number of tools, transmitters, and/or receivers to perform downhole measurement operations. For example, as illustrated in FIG. 1, BHA 130 may include a measurement assembly 134. It should be noted that measurement assembly 134 may make up at least a part of BHA 130. Without limitation, any number of different measurement assemblies, communication assemblies, battery assemblies, and/or the like may form BHA 130 with measurement assembly 134. Additionally, measurement assembly 134 may form BHA 130 itself. In examples, measurement assembly 134 may comprise at least one transducer 136, which may be disposed at the surface of measurement assembly 134. Without limitation, transducer 136 may also be disposed within measurement assembly 134. Without limitation, there may be four transducers 136 that may be disposed ninety degrees from each other. However, it should be noted that there may be any number of transducers 136 disposed along BHA 130 at any degree from each other. Transducers 136 may function and operate to generate an acoustic pressure pulse that travels through borehole fluids. In examples, transducers 136 may further sense and acquire the reflected pressure wave which is modulated (i.e., reflected as an echo) by the borehole wall. During measurement operations, the travel time of the pulse wave from transmission to recording of the echo may be recorded. This information may lead to determining a radius of the borehole, which may be derived by the fluid sound speed. By analyzing the amplitude of the echo signal, the acoustic impedance may also be derived. Without limitation, transducers 136 may be made of piezo-ceramic crystals, or optionally magnetostrictive materials or other materials that generate an acoustic pulse when activated electrically or otherwise. In examples, transducers 136 may also include backing materials and matching layers. It should be noted that transducers 136 and assemblies housing transducers 136 may be removable and replaceable, for example, in the event of damage or failure.

Without limitation, BHA 130 may be connected to and/or controlled by information handling system 138, which may be disposed on surface 108. Without limitation, information handling system 138 may be disposed downhole in BHA 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until BHA 130 may be brought to surface 108. In examples, information handling system 138 may communicate with BHA 130 through a communication line (not illustrated) disposed in (or on) drill string 116. In examples, wireless communication may be used to transmit information back and forth between information handling system 138 and BHA 130. Information handling system 138 may transmit information to BHA 130 and may receive as well as process information recorded by BHA 130. In examples, a downhole information handling system (not illustrated) may include, without limitation, a microprocessor or other suitable circuitry, for estimating, receiving and processing signals from BHA 130. Downhole information handling system (not illustrated) may further include additional components, such as memory, input/output devices, interfaces, and the like. In examples, while not illustrated, BHA 130 may include one or more additional components, such as analog-to-digital converter, filter and amplifier, among others, that may be used to process the measurements of BHA 130 before they may be transmitted to surface 108. Alternatively, raw measurements from BHA 130 may be transmitted to surface 108.

Any suitable technique may be used for transmitting signals from BHA 130 to surface 108, including, but not limited to, wired pipe telemetry, mud-pulse telemetry, acoustic telemetry, and electromagnetic telemetry. While not illustrated, BHA 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from BHA 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into a two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from BHA 130 of the formation properties may be used to steer drilling system 100 toward a subterranean formation 106.

Figure 2:
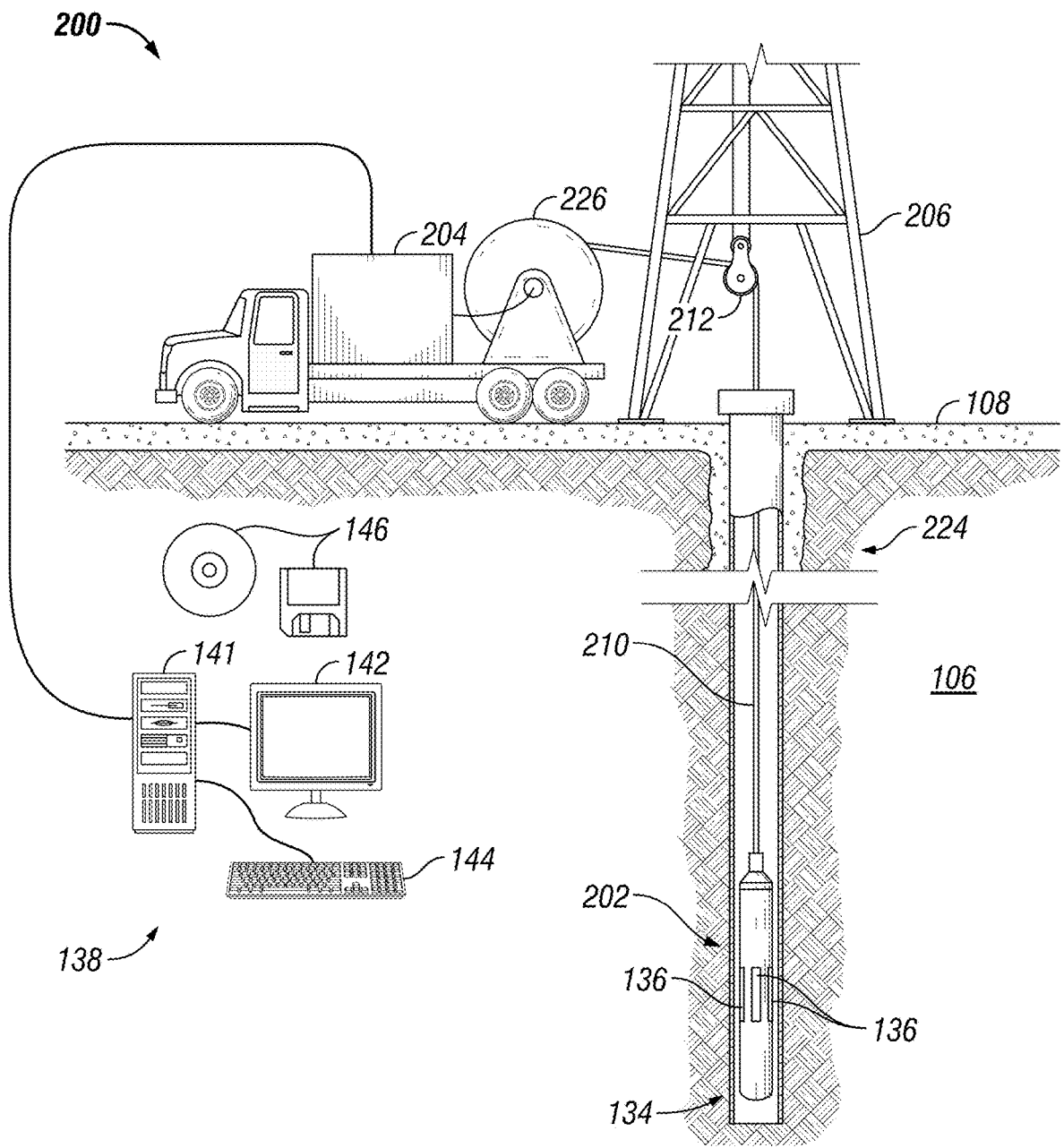
FIG. 2 illustrates an example of a well measurement system.

FIG. 2 illustrates a cross-sectional view of a well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored on memory and then processed by downhole tool 202. The processing may be performed real-time during data acquisition or after recovery of downhole tool 202. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from borehole 224. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produce in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of borehole 224. Information handling system 138 may comprise a safety valve (not illustrated) which controls the hydraulic pressure that drives drum 226 on vehicle 204 which may reel up and/or release conveyance 210 which may move downhole tool 202 up and/or down borehole 224. The safety valve may be adjusted to a pressure such that drum 226 may only impart a small amount of tension to conveyance 210 over and above the tension necessary to retrieve conveyance 210 and/or downhole tool 202 from borehole 224. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may comprise at least one transducer 136, which may be disposed at the surface of measurement assembly 134. Without limitation, transducer 136 may also be disposed within measurement assembly 134. Without limitation, there may be four transducers 136 that may be disposed ninety degrees from each other. However, it should be noted that there may be any number of transducers 136 disposed along BHA 130 at any degree from each other. Transducers 136 may function and operate to generate and receive acoustic pulses in the borehole fluid.

Figure 3:
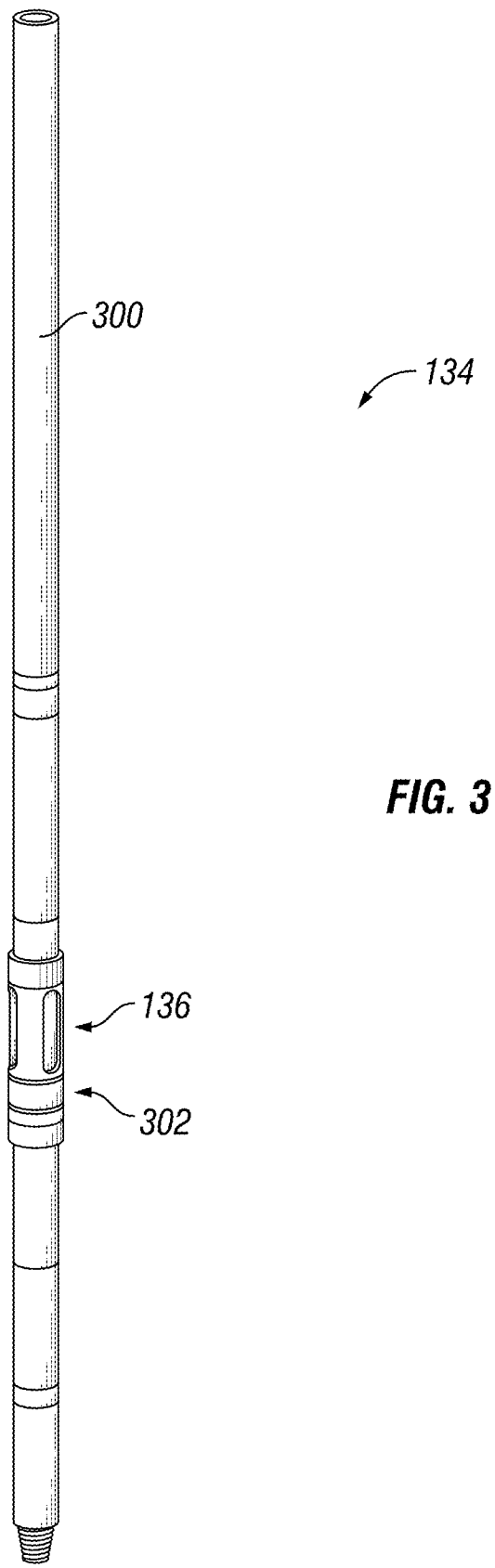
FIG. 3 illustrates an example of a measurement assembly.

FIG. 3 illustrates a close up view of measurement assembly 134. As illustrated, measurement assembly 134 may comprise at least one battery section 300 and at least on instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136, which may be disposed at any end of battery section 300 in instrument section 302.

Instrument section 302 may house at least one transducer 136. As describe above, transducer 136 may operate and function and operate to generate an acoustic pressure pulse that travels through borehole fluids. During operations, transducer 136 may emit a pressure wave, specifically an ultrasonic pressure pulse wave. The pressure pulse may have a frequency range from 200 kHz-400 kHz, center around 250 KHz. It should be noted that the pulse signal may be emitted with different frequency content. As discussed above, transducers 136 may be referred to as a caliper, sensors, a "pinger," and/or transceiver, which may allow transducers 136 to measure and/or record echoes. Recordings and/or measurements taken by transducer 136 may be transmitted to information handling system 138 by any suitable means, as discussed above.

During drilling operations, drilling dynamics and vibrations experienced by BHA 130 and drill bit 122 (e.g., referring to FIG. 1) may damage and/or add wear to BHA 130 and drill bit 122, which may reduce drilling performance. Operational failures may result in hundreds of millions of dollar loss due to productivity loss and increased drilling cost. During drilling operations high-frequency measurements may be utilized to determine borehole and formation properties. High-frequency measurements may provide information on drilling-system responses and vibration modes as causes for drilling inefficiency and unsatisfactory drilling performance. Without limitation, damage to drill bit 122 may be due to a transition from low-level torsional oscillations into forward whirls, backward whirls, and chaotic whirls. It should be noted that whirls are defined as eccentric motion of drill bit 122 in a borehole, generally, an orbital motion either in clockwise or counter clockwise direction. Therefore, it may be important to monitor the onset of whirls and quantify their severity. One may then feedback the information measured and/or recorded to the controller of the drilling dynamics to ensure smooth drilling process and prevent drill bit 122 from accelerated wear and damage.

In examples, a downhole tool and/or BHA 130 may include about twenty sensors, which may be continuously record in an X direction, Y direction, Z direction, radially, and tangential accelerations, shocks, axial load, torque, inclination, bending and pressure temperature, etc. These sensors may operate and/or function in a high frequency band. Without limitation, wide band high frequency accelerometers may measure acceleration, which includes propagating waves. Detecting the motion of BHA 130 (e.g., referring to FIG. 1) or downhole tool 202 may allow for the detection of whirl downhole. Previous attempts of numerically integrating of acceleration data fail to generate stable tool center trajectory. Currently, bending sensors may be utilized to derive the torsional tool center movements with limited success. This is due to bending derived tool movement may be subject to random vibrating forces due to stabilizer or bit impact against the borehole wall.

A more accurate rigid tool center motion may come from a direct measurement. As discussed below, multi-ultrasonic-transducer caliper measurement may provide measurements of borehole properties and may generate borehole images/hole qualities and borehole acoustic impedance, which may be correlated to controllable drilling parameters (e.g., WOB, TOB, RPM, and ROP) in order to assist a smoothed drilling process.

In examples, the position of measuring assembly 134 tool with respect to the distance from drill bit 122 (e.g., referring to FIG. 1), four transducer measurements may provide hole shape information at an offset to drill bit 122. It should be noted that the transducer may be a part of transducers 136 (e.g., referring to FIG. 3) which may emit a pressure pulse and also record echoes. Echoes may be the reflection of the pressure pulse off the wall of a borehole. Determining time delay, rotation of measuring assembly 134, and recorded vibrational information may be correlated to real time hole condition during drilling operations at a current transducer measurement depth. It should be noted that time delay, described above, is defined as drilling time from sensor position (i.e., transducer 136) to reach depth of the current drill bit 122. Therefore, a critical feedback correlation between drilling dynamics to the shape a geometrical quality of a borehole may be established. This may allow an operator or a downhole controller (e.g., for an automated process) to recognize borehole shape variations during drilling operations and may allow changes in drilling operations to improve drilling efficiency.

FIGS. 2 and 3 illustrate plots 400 and 500 of example data point illustrating how the embodiments disclosed herein may be used to estimate borehole shape. In the examples shown, each data point set includes eight data points that were each generated by four transducers 136, wherein four of the data points correspond to a first measurement set, and the other four data points correspond to a second measurement set. From these data points, a determination may be made regarding whether an ellipse, a circle, or some other circular or ovoid shape should be used as an approximation of the shape of the wellbore 102 (e.g., referring to FIG. 1).

Selecting a shape, such as an ellipse, to fit to the data points generally requires at least five azimuthally well distributed data points. Specifically, the minimum of five data points is used to determine several parameters of the ellipse. Examples of the parameters include a center location (x, y), a major axis, a minor axis, and orientation of the major axis. When the data points are clustered and not azimuthally well distributed, the ellipse may have an irrational major-minor axis ratio that increases elongation of the ellipse, resulting in an irrational or exaggerated elongation. Such an elongation may mean that the shape of the ellipse was unduly influenced by, and hence overly sensitive to, inaccuracies of the data points. A circle would be a better shape to fit to such clustered data points.

The above clustering of data points may be caused, for example, when transducer 136 (e.g., referring to FIG. 3) disposed on measuring assembly 134 (e.g., referring to FIG. 3) does not rotate or rotates too slowly. This may be, for example, due to a malfunction or due to translational movement of measuring assembly 134 without rotation, such as when a measuring assembly 134 is advancing along the length of wellbore 102 (e.g., referring to FIG. 1).

Figure 4:
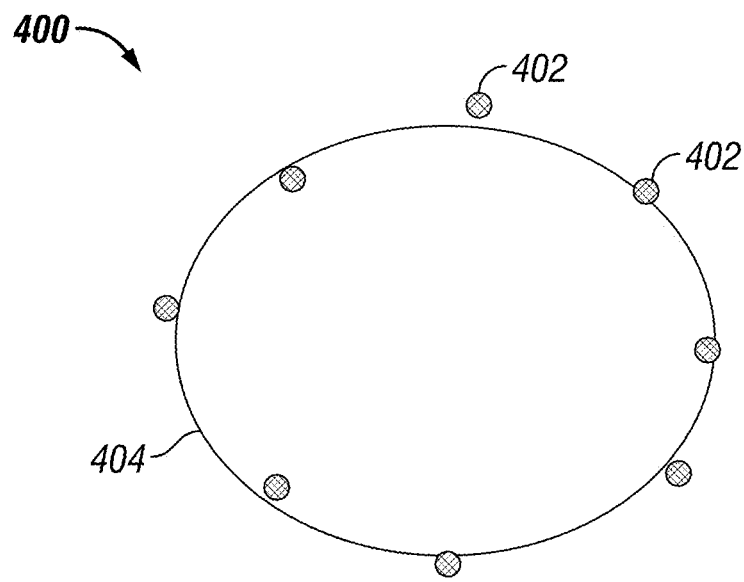
FIG. 4 is a plot of azimuthally distributed data points that illustrates an example of a rationally elongated fitted ellipse.

Plot 400 shown in FIG. 4 shows example data points 402 that are azimuthally well distributed. The term "azimuthally well distributed" refers to the data points being more widely distributed around the circumference of the borehole rather than forming closely grouped clusters of data points. Since the data points 402 are azimuthally well distributed, the data points 402 may be suitable for being fitted by an ellipse, for example, first ellipse 404. The first ellipse 404 may be fitted to data points 402 because no distortion of the ellipse is needed to accommodate for clustering due to measurement tolerance related inaccuracies associated with the data points 402.

Figure 5:
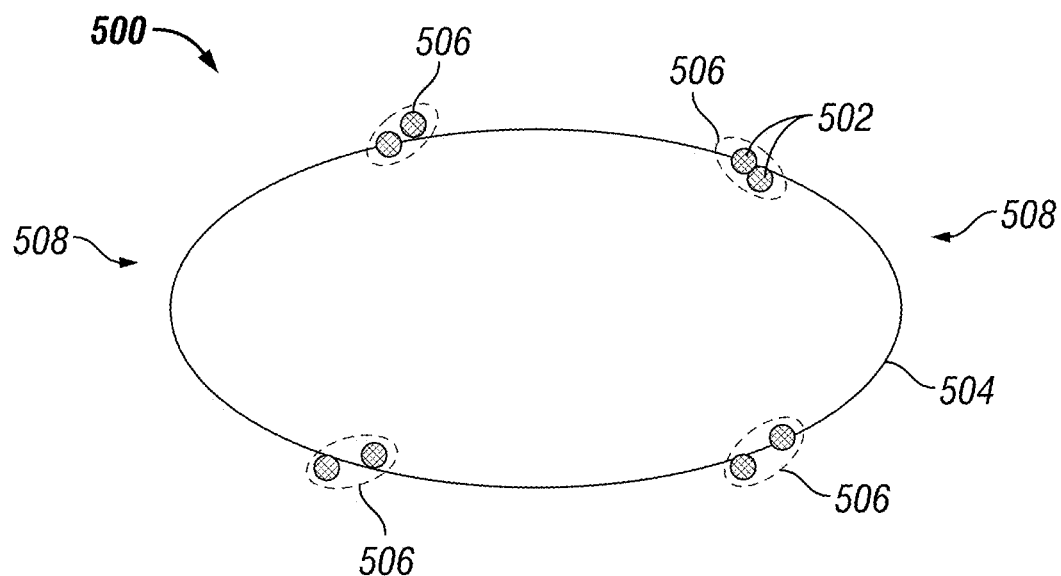
FIG. 5 is a plot of azimuthally clustered data points that illustrates an example of an irrationally elongated fitted ellipse.

In contrast, plot 500 shown in FIG. 5 shows example data points 502 that may be azimuthally clustered, rather than azimuthally well distributed. As illustrated, while it is possible to fit an ellipse, for example, second ellipse 504, to data points 502, data points 502 may not be suitable for fitting by an ellipse, as data points 502 are clustered at mainly four cluster areas 506 (designated by a dotted line). The lack of azimuthally well distributed data points requires second ellipse 504 to be distorted (i.e., elongated) in order to fit to data points 502. This causes second ellipse 504 to include elongated areas 508 that may be devoid of data points 502. Thus, rather than fitting an ellipse to data points 502 shown in FIG. 5, a circle may be a better shape to use in order to minimize any inaccuracies associated with the clustering.

Figure 6:
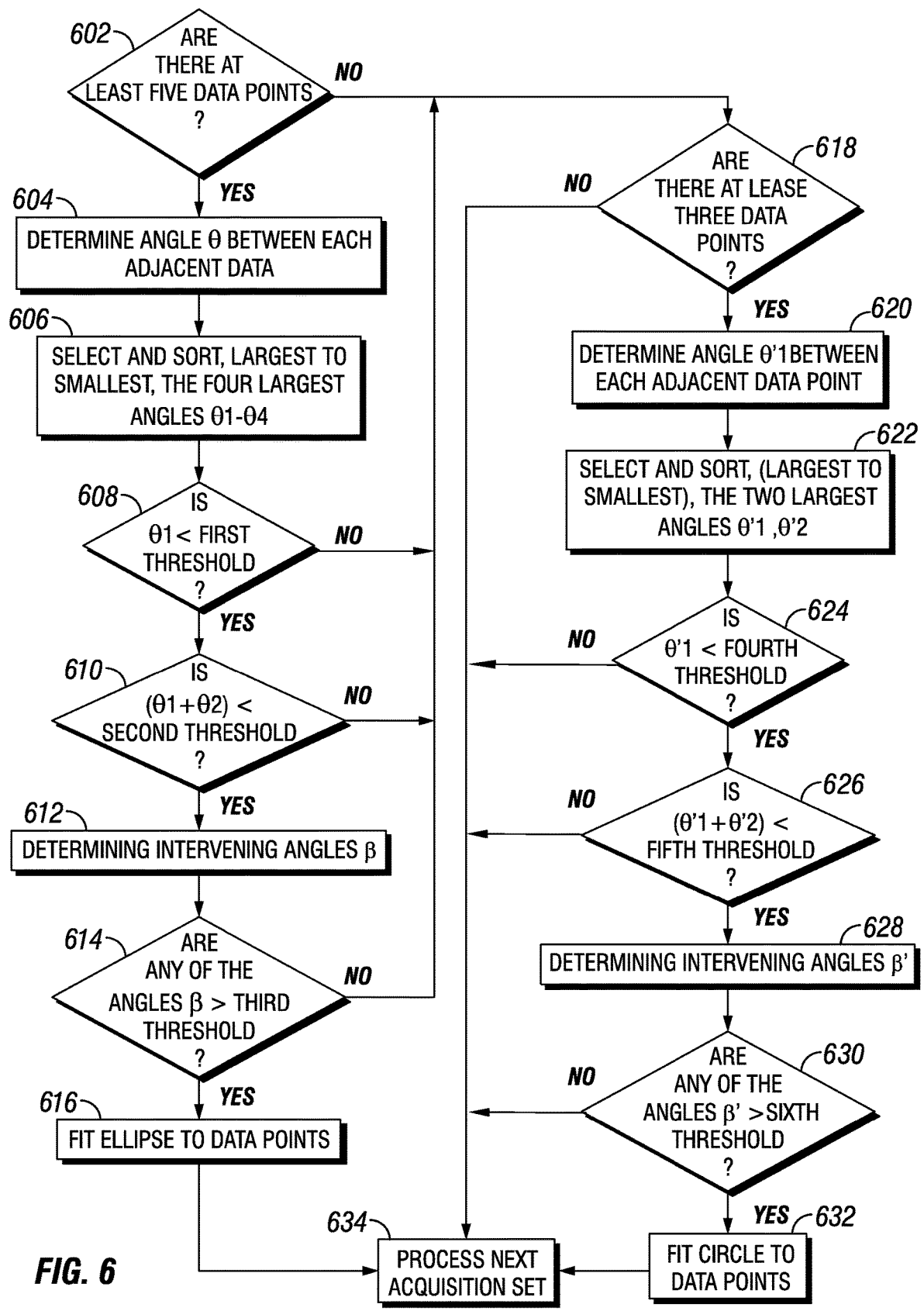
FIG. 6 is a flowchart that illustrates example operation of a method in accordance with the disclosure.

With reference now to FIG. 6, a method is shown as a flowchart demonstrating implementation of the various exemplary embodiments. In general, the method applies several criteria to determine whether an ellipse, a circle, or some other geometric shape may be suitable as an estimate of borehole shape for a given set of data points. It is noted that the order of operations shown in FIG. 6 is not set and various operations may be performed out of the illustrated order. Also, certain operations may be skipped, different operations may be added or substituted, or selected operations or groups of operations may be performed in a separate application following the embodiments described herein.

The method generally begins at step 602, where a first criterion for fitting an elliptical shape (e.g., an ellipse) to the data points is applied by determining whether there may be at least five data points. If the determination at step 602 is YES, the first criterion has been satisfied indicating that the data points may be fitted by an ellipse, and the method continues at step 604. If the determination at step 602 is NO, the first criterion has not been satisfied, meaning the data points may not be good candidates to be fitted by an ellipse, in which case the method continues at step 618.

At step 604, an angle referred to herein as angle "Θ" for convenience is determined between each pair of adjacent data points. Recall from above that an azimuth is measured and with every standoff data point. These azimuth values may then be used to derive the angles Θ. Specifically, each angle Θ may be derived by subtracting an azimuth of one data point from an azimuth of an adjacent data point. Each of the angles Θ, also called point-to-point angles, maybe defined by two adjacent data points, without any data points between the adjacent data points. More particularly, determining each angle Θ, or point-to-point angle, may include arranging the data points in order from 1 to n around the circumference of the borehole based on the azimuth of each data point (e.g., smallest to largest) determined using a magnetic north reference or borehole high side reference (i.e., the upward direction perpendicular to the borehole's axis in the local vertical plane). Thus, the first angle Θ is between data points (1, 2), the second angle Θ is between data points (2, 3), and so on, with the last angle Θ being between data points (n–1, n). At step 606, the four largest angles, designated as angles Θ1-Θ4, are selected and sorted from largest to smallest, with Θ1 being the largest. Note that in the current example, the four largest angles may be sorted and selected; however, in other embodiments a different number (e.g., five, three, etc.) of largest angles may be sorted and selected.

At step 608, a second criterion for fitting an ellipse to the data points is applied by determining whether the largest angle Θ1 is less than a first threshold. In an example and without limitation, the first threshold is at or about 120 degrees. If the determination at step 608 is YES, the second criterion has been satisfied, indicating that an ellipse may be fitted to the data points, and the method continues at step 610. If the determination at step 608 is NO, the second criterion has not been satisfied, meaning the data points may not be good candidates for fitting by an ellipse, and the method continues at step 618.

At step 610, a third criterion for using an ellipse to be fitted to the data points may be applied by determining whether the sum of the two largest angles, Θ1+Θ2, is less than a second threshold. It should be noted that the current example, the two largest angles Θ1 and Θ2 are summed, but in other embodiments a different number of largest angles may be summed. In an example and without limitation, the second threshold may be at or about 180 degrees, although other angle values may also be used for the second threshold. If the determination at step 610 is YES, the third criterion has been satisfied indicating that an ellipse may be fitted to the data points, and the method continues at step 612. If the determination at step 610 is NO, the third criterion has not been satisfied, meaning the data points may not be good candidates for being fitted by an ellipse, in which case the method continues at step 618.

At step 612, the remaining point-to-point angles that were not selected as one of the four largest angles Θ1-Θ4 are used to determine whether an ellipse may be fitted to the data points. Specifically, adjacent ones of the unselected point-to-point angles are combined to form intervening angles, referred to herein as angles β" for convenience. Each intervening angle β is thus defined as the angle between each pair of adjacent data points making up each of the four largest point-to-point angles Θ1-Θ4. But unlike the pair of adjacent data points making up each angle Θ1-Θ4, an intervening angle β may include two, three, or more data points, as there may be multiple data points between any two consecutive angles Θ1-Θ4. As well, instead of intervening angles β that are between the four largest angles Θ1-Θ4, a different number of largest angles Θ (e.g., three, five, etc.) may be used. In either case, the intervening angles β indicate quality of azimuthal distribution of the data points (i.e., how close or far the data points are to one another around the circumference of the borehole).

At step 614, a fourth criterion for using an ellipse to fit to the data points is applied by determining whether at least a predetermined number of intervening angles β are greater than a third threshold. In the current example, the fourth criterion is satisfied if at least one of the intervening angles β is greater than the third threshold. In other embodiments, a different number of intervening angles β may be required to be greater than the third threshold. In an example and without limitation, the third threshold is at or about 20 degrees; however, other values may be used for the third threshold.

If the determination at step 614 is YES, the fourth criterion has been satisfied indicating that the data points may be fitted by an ellipse, and the method continues at step 616. If the determination at step 614 is NO, the fourth criterion has not been satisfied, meaning the data points may not be good candidates to be fitted by an ellipse, and the method continues at step 618. At step 616, an ellipse is fitted to the data points, for instance, using a conventional algorithm for fitting ellipses to data points, as is known to a person skilled in the art. Examples of algorithms that may be used include least squares fitting (LSF) and Hough-based methods. The method then advances to step 634 where a next data point set associated with a next standoff measurement acquisition is accessed for processing.

As alluded to above, if the data points may not be suitable for an ellipse, the method skips to step 618 to determine whether another shape, such as a circle, may be used to fit the data points. For the circular shape determination, point-to-point angles and intervening angles are also used, but to avoid potential confusion, these angles are referred to as point-to-point angles θ' and intervening angles β'.

Continuing at step 618, a fifth criterion, this one used for fitting a circular shape (e.g., a circle) to the data points, is applied by determining whether there are at least three data points. If the determination at step 618 is YES, the fifth criterion has been satisfied indicating that the data points may be fitted by a circle, and the method continues at step 620. If the determination at step 618 is NO, the fifth criterion has not been satisfied, meaning the data points may not be good candidates to be fitted by either a circle or an ellipse, in which case the method continues at step 634 to process the next data point set associated with the next acquisition.

To further determine whether a circle may be used, at step 620, a point-to-point angle θ' is determined between each adjacent data point. As with the angles Θ above, each the of the angles θ' is defined by two adjacent data points, without any data points in between. At step 622, the two largest point-to-point angles Θ'I, θ'2 are selected and sorted from largest to smallest, with Θ'I being the largest. While in the current example the two largest point-to-point angles are sorted and selected, a different number of largest point-to-point angles may be sorted and selected in other embodiments.

At step 624, a sixth criterion for fitting a circle to the data points may be applied by determining whether the largest point-to-point angle, angle Θ'I, is less than a fourth threshold. In an example and without limitation, the fourth threshold may be at or about 180 degrees, although other values can be used for the fourth threshold. If the determination at operation 624 is YES, the sixth criterion has been satisfied indicating that the data points may be fitted by a circle, and the method continues at step 626. If the determination at step 624 is NO, the sixth criterion has not been satisfied, meaning the data points may not be good candidates to be fitted by either a circle or an ellipse, in which case the method continues at step 634 to process the next data point set associated with the next acquisition.

At step 626, a seventh criterion for fitting a circle to the data points is applied by determining whether the sum of two largest point-to-point angles, Θ'I+θ'2, is less than a fifth threshold. In an example and without limitation, the fifth threshold may be at or about 270 degrees, although other values may be used for the fifth threshold. If the determination at operation 626 is YES, the criterion has been satisfied, indicating that the data points may be fitted by a circle, and the method continues at step 628. If the determination at step 626 is NO, the seventh criterion has not been satisfied, meaning the data points may not be candidates to be fitted by either a circle or an ellipse, and the method continues at step 634 to process the next data point set associated with the next acquisition.

At step 628, the intervening angles β' that were not selected to be one of the two largest point-to-point angles Θ'I, θ'2 are determined. Each intervening angle β' is measured between the two largest point-to-point angles Θ'I, θ'2. At step 630, an eighth criterion for fitting a circle to the data points is applied by determining whether at least one of the intervening angles β' is greater than a sixth threshold. In the current example, the eighth criterion is satisfied if at least one of the intervening angles β' is greater than the sixth threshold; however, in other embodiments a different number of intervening angles β' may be required to be greater than the sixth threshold. In an example and without limitation, the sixth threshold may be at or about 45 degree, although other values may be used for the sixth threshold.

If the determination at step 630 is YES, the eighth criterion has been satisfied, indicating that the data points may be fitted by a circle, and the method continues at step 632. If the determination at step 630 is NO, the eighth criterion has not been satisfied, meaning the data points may not be good candidates to be fitted by either a circle or an ellipse, and method thereafter continues at step 634 to process the next data point set associated with the next acquisition.

At step 632, a circle is fitted to the data points, for example, using a conventional algorithm for fitting circles to data points, as is known to a person skilled in the art, such as an LSF for circle fitting. The method then advances to step 634, where a next data point set associated with a next acquisition is accessed for processing.

As illustrated in FIG. 6, once it is determined that an ellipse should not be fitted to the data points and the method moves to step 618, no further attempts are made to determine whether an ellipse should be fitted to the data points until a subsequent set of standoff data points.

Note also that the examples in FIG. 6 requires each of the first, second, third, and fourth criterion to be met in order to fit an ellipse to the data points. In other embodiments, once the first criterion is met, any combination of one or more of the second, third, and fourth criteria may be required to fit an ellipse to the data points. Accordingly, the determination whether to fit an ellipse or a circle to the data points is based on at least one of the angles spanning between adjacent data points. Similarly, the embodiment shown in FIG. 6 require that each of the fifth, sixth, seventh, and eighth criteria are met in order to fit a circle to the data points. In other embodiments of the disclosure, once the fifth criterion is met, any combination of one or more of the sixth, seventh, and eighth criteria may be required to fit a circle to the data points.

Figure 7:
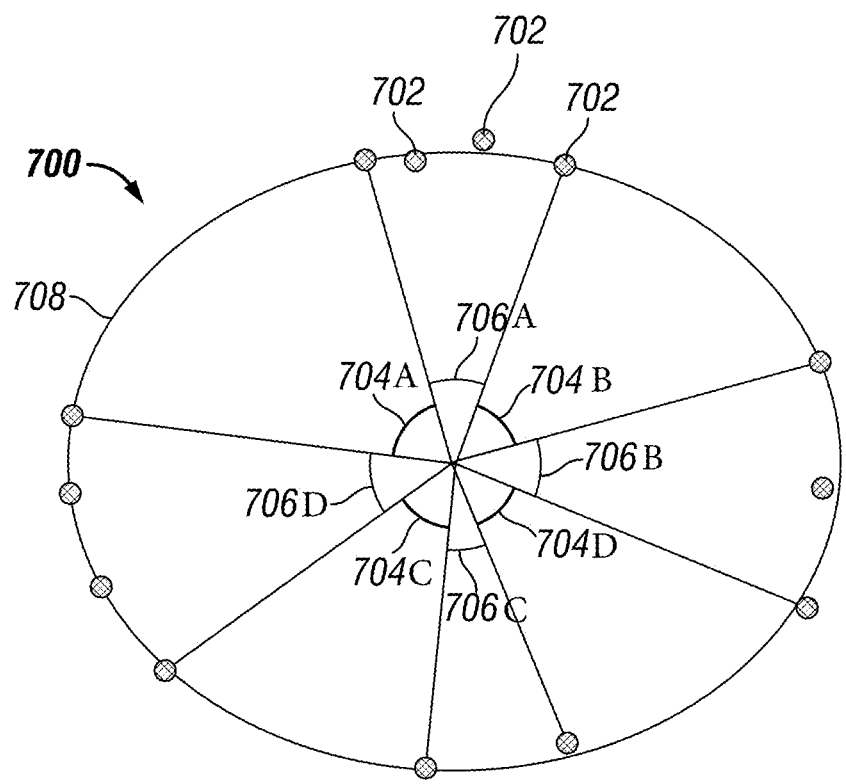
FIG. 7 is a plot of a first set of example data points and example largest point-to-point angles, intervening angles, and fitted ellipse in accordance with the disclosure.

With reference to FIG. 7, a plot 700 is shown of an example set of data points 702 associated with an acquisition. The set of data point 702 includes greater than five data points 702, satisfying the first criterion (e.g., as designated at step 602). The plotted positions of data points 702 reflects the standoff and azimuth values associated with each data point 702.

Adjacency of data points 702 and angles formed between adjacent data points 702 may be determined (e.g., in accordance with step 604). As explained earlier, the angle of every caliper point is measured by an azimuthal sensor reference to magnetic north or the borehole high side. The largest four point-to-point angles 704A-704D (collectively referred to as largest angles 704) may be determined and sorted by angle value (e.g., in accordance with step 606). The largest angle 704A may then be compared to the first threshold (e.g., in accordance with step 708 and the second criterion).

Intervening angles 706A-706D (collectively referred to as angles 706) may be determined (e.g., in accordance with step 612). Each of the intervening angles 706 spans between adjacent pairs of data points 702 that make up each of the largest point-to-point angles 704. Thus, intervening angle 706A is between largest angles 704A and 704B, intervening angle 706B is between largest angles 704B and 704D, intervening angle 706C is between largest angles 704C and 704D, and intervening angle 706D is between largest angles 704C and 704A.

A determination may be made whether any of the intervening angles 706 exceeds the third threshold (e.g., in accordance with the fourth criterion and step 608). Based on satisfaction of the first, second, and third criterion, an ellipse 708 is fitted to data points 702 using an ellipse fitting algorithm (e.g., in accordance with step 616).

Figure 8:
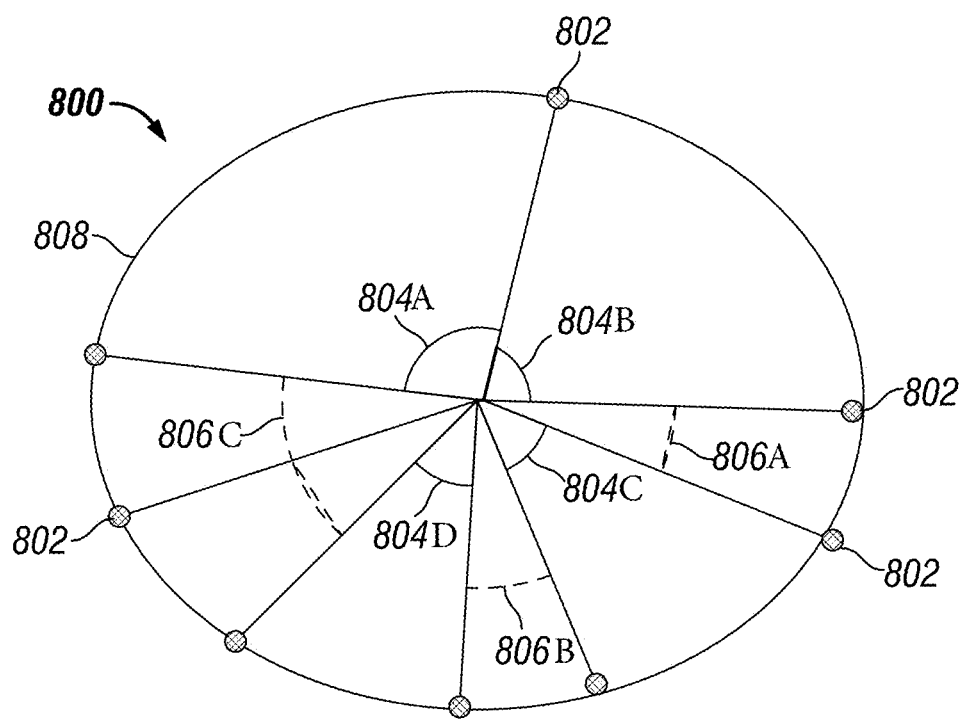
FIG. 8 is a plot of a second set of example data points and example largest point-to-point angles, intervening angles, and fitted ellipse in accordance with the disclosure.

With reference to FIG. 8, a plot 800 is shown of another example set of data points 802 associated with an acquisition, data points 802 having respective associated angles. The plotted position of data points 802 is determined using the standoff and azimuth values associated with each data point 802, and the angles may be determined (e.g., in accordance with step 604). A set of largest four point-to-point angles 804A-804D (collectively referred to as largest angles 804) may be selected and sorted based on the order of the size of the angle (e.g., in accordance with step 606). A sum of the angles associated with the largest two angles 804A and 804B may be compared to the second threshold (e.g., in accordance with step 610).

In this example, intervening angles 806A-806C (collectively referred to as intervening angles 806) that were not determined to be among the largest four angles 804, may not be determined (e.g., in accordance with step 612). Each intervening angle 806 may not be included with the largest point-to-point angles 804, but is disposed between adjacent pairs of the largest angles 804. Intervening angle 806A is disposed between largest angles 804B and 804C, intervening angle 806B is disposed between largest angles 804C and 804D, and intervening angle 806C is disposed between largest angles 804A and 804D. One of the data points 802 is positioned within the span of intervening angle 806C, and there may not be any intervening angles 806 disposed between largest angles 804A and 804B, as they are adjacent to one another. Based on satisfaction of the first, second, and third criterion, an ellipse 808 is fitted to the data points 802 using an ellipse fitting algorithm (e.g., in accordance with step 616).

Figure 9:
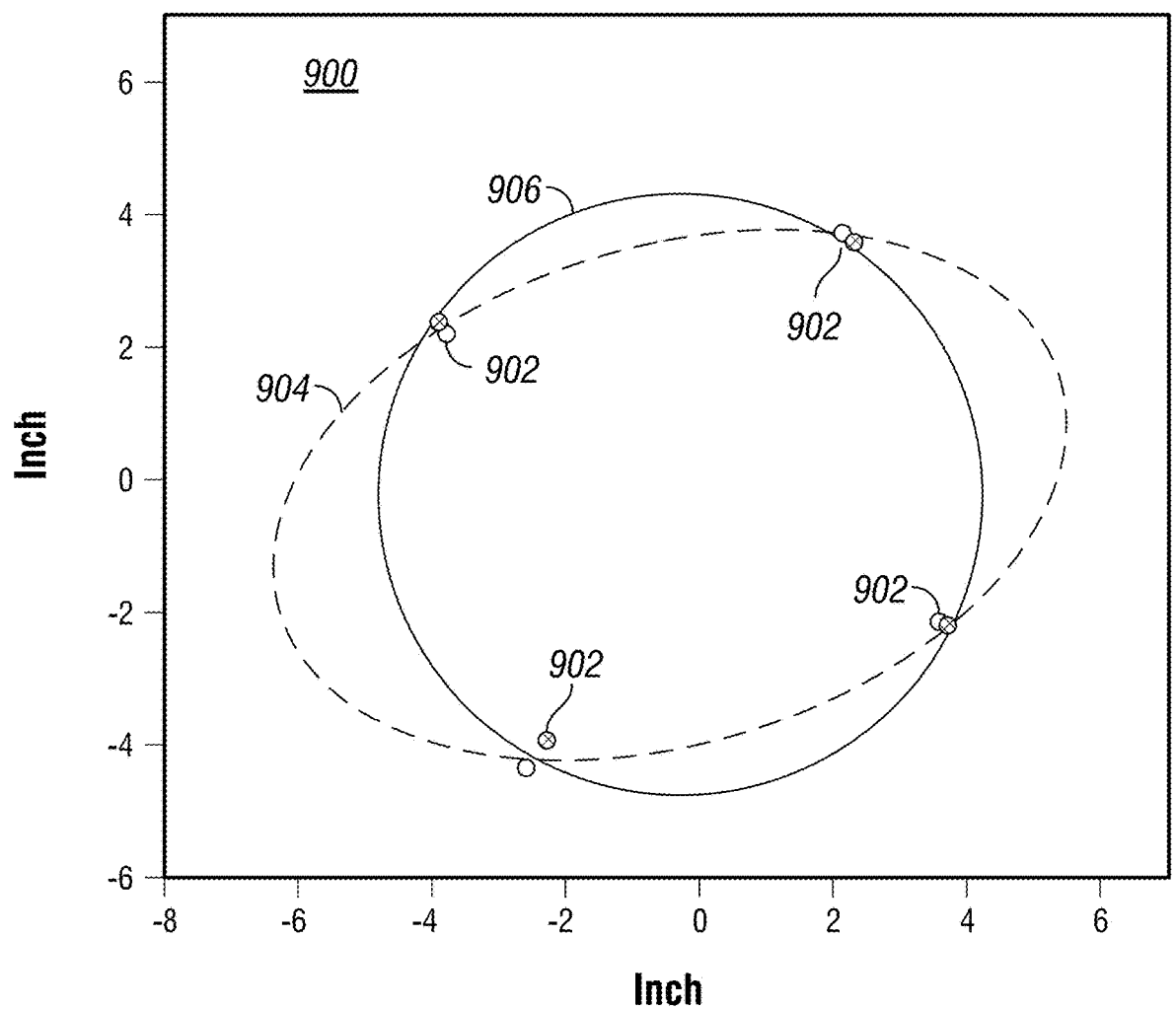
FIG. 9 is a plot of actual data points with a fitted ellipse and a fitted circle.

With reference to FIG. 9, plot 900 is shown with another set of data points 902 for purposes of comparing borehole estimation with and without using the embodiments disclosed herein. Data points 902 in this example are azimuthally clustered in four distinct areas with many of data points 902 superimposed upon one another. Without the method of the present disclosure, existing solutions may try to fit an ellipse 904 to data points 902 (e.g., using known ellipse fitting techniques). Since data points 902 are azimuthally clustered, such a fitted ellipse 904 (shown with a dotted line) would be irrationally elongated. When the method of the disclosure is applied, a determination would be made that an ellipse would be a poor fit for data points 902, but that a circle would be a better fit for the data points 902. Circle 906 is fitted to data points 902 for comparison purposes in FIG. 9, such circle 906 providing a reasonably good fit to data points 902.

It should be noted that each block of the flowchart illustrations and/or block diagrams, and combinations of blocks in the flowchart illustrations and/or block diagrams, may be implemented by information handling system 138 (e.g., referring to FIG. 1). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

Figure 11:
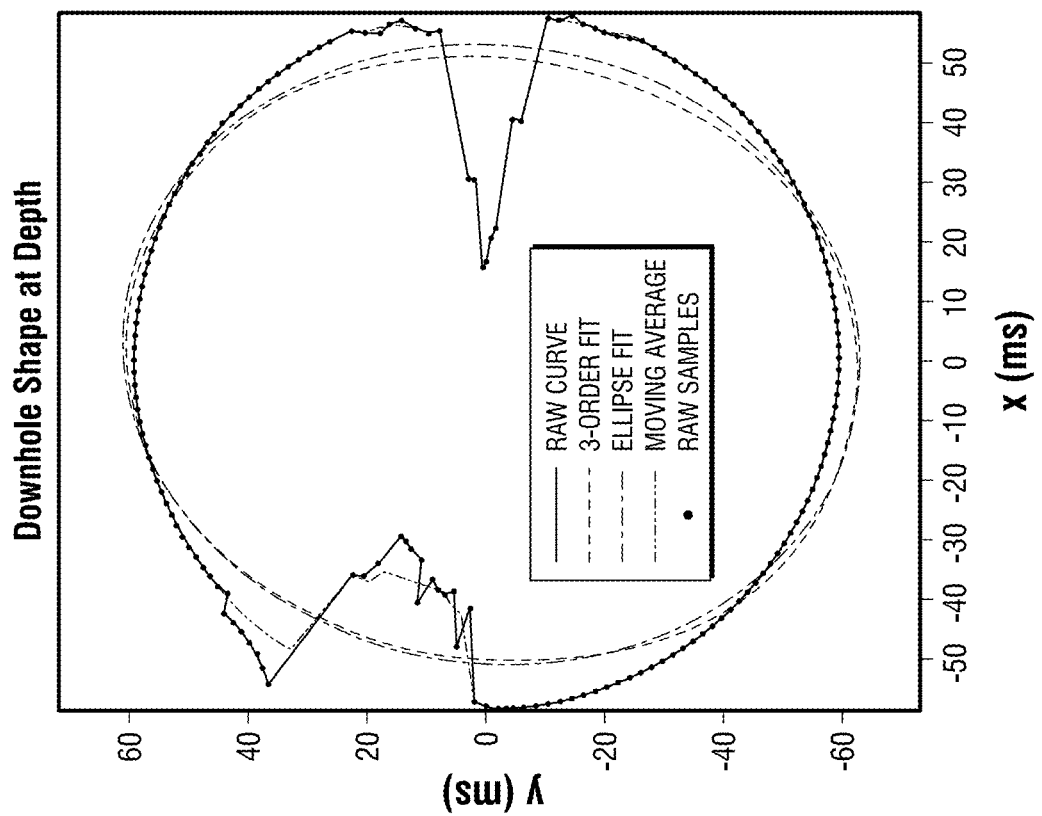
FIG. 11 is a graph of a non-smooth borehole.
Figure 10:
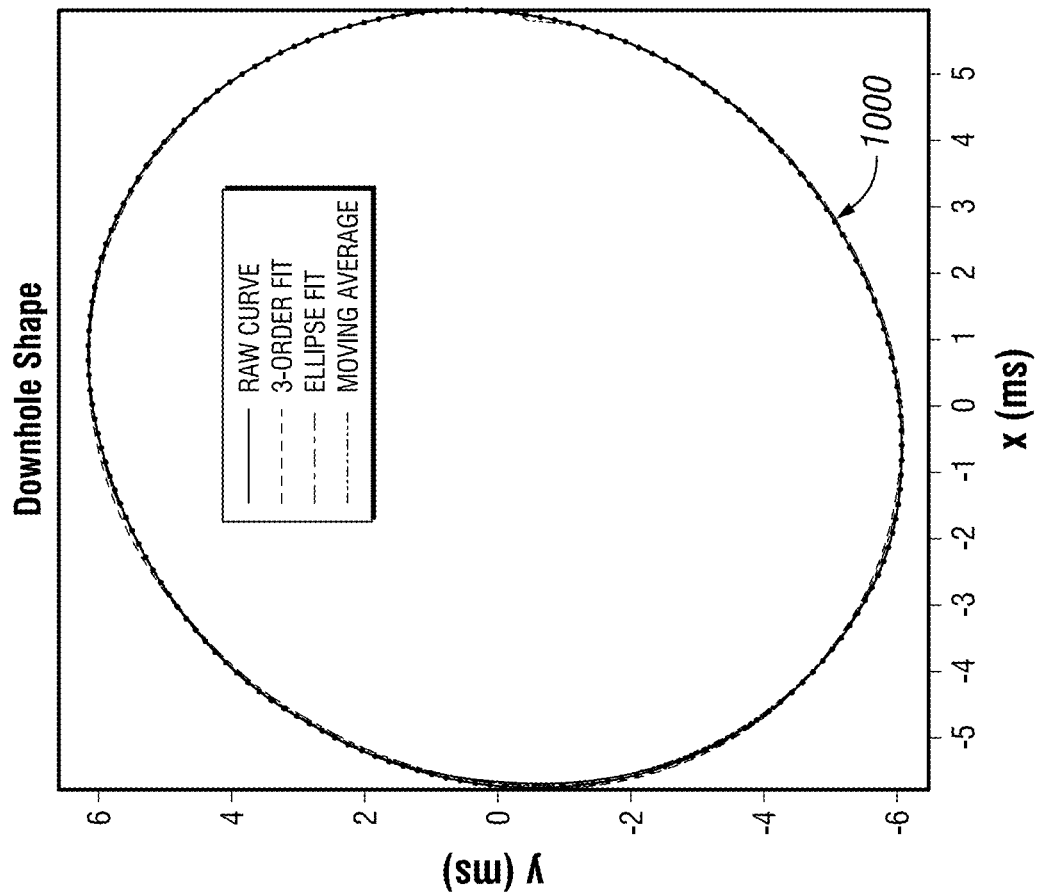
FIG. 10 is a graph of a smooth borehole.

FIG. 10 is a graph of a smooth borehole 400 after processing measurements within information handling system 138 (e.g., referring to FIG. 1) utilizing workflow from FIG. 6. Currently, a borehole shape may be estimated using an ovality algorithm, which fits measurements that for an ellipse. In a clean borehole an ovality algorithm may work, however, the ovality algorithms fail to handle distorted measurements, as illustrated in FIG. 11. Distorted measurements may be caused due to noise or heavy debris or weighting material suspended in the mud.

Current approaches to avoid fitting on distorted measurements is to sort out measurements that deviated too much by a fit-and-sort method. This is done by making initial fitting of an ellipse to all available measurements (i.e. including distorted ones). Once having the initial ellipse, the distance from each measurement to the ellipse is then computed. Those distances are then evaluated and the largest distances above a specific threshold will be sorted out. This first iteration is completed.

Figure 12:
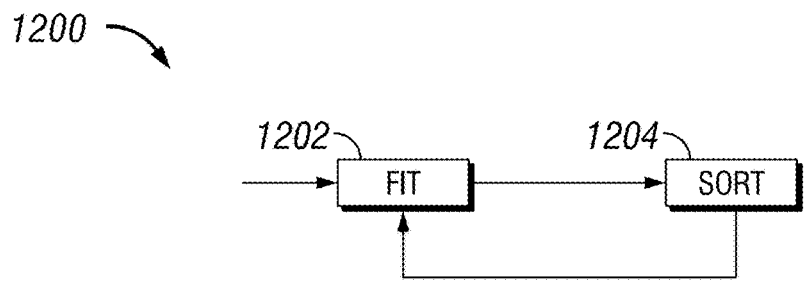
FIG. 12 is a workflow for a fit-and-sort loop.

FIG. 12 illustrates workflow 1200 for a fit-and-sort loop. For example, in step 1202, a new ellipse will be fit on the remaining measurements (after the previous sorting step). It should be noted that step 1202 incorporates the workflow from FIG. 6. In step 1204, distances from all measurements to the new ellipse are then re-evaluated and used to sort out non-fitted measurements. The fit and sort method will keep repeating until not much change in the size of the ellipses.

Figure 13:
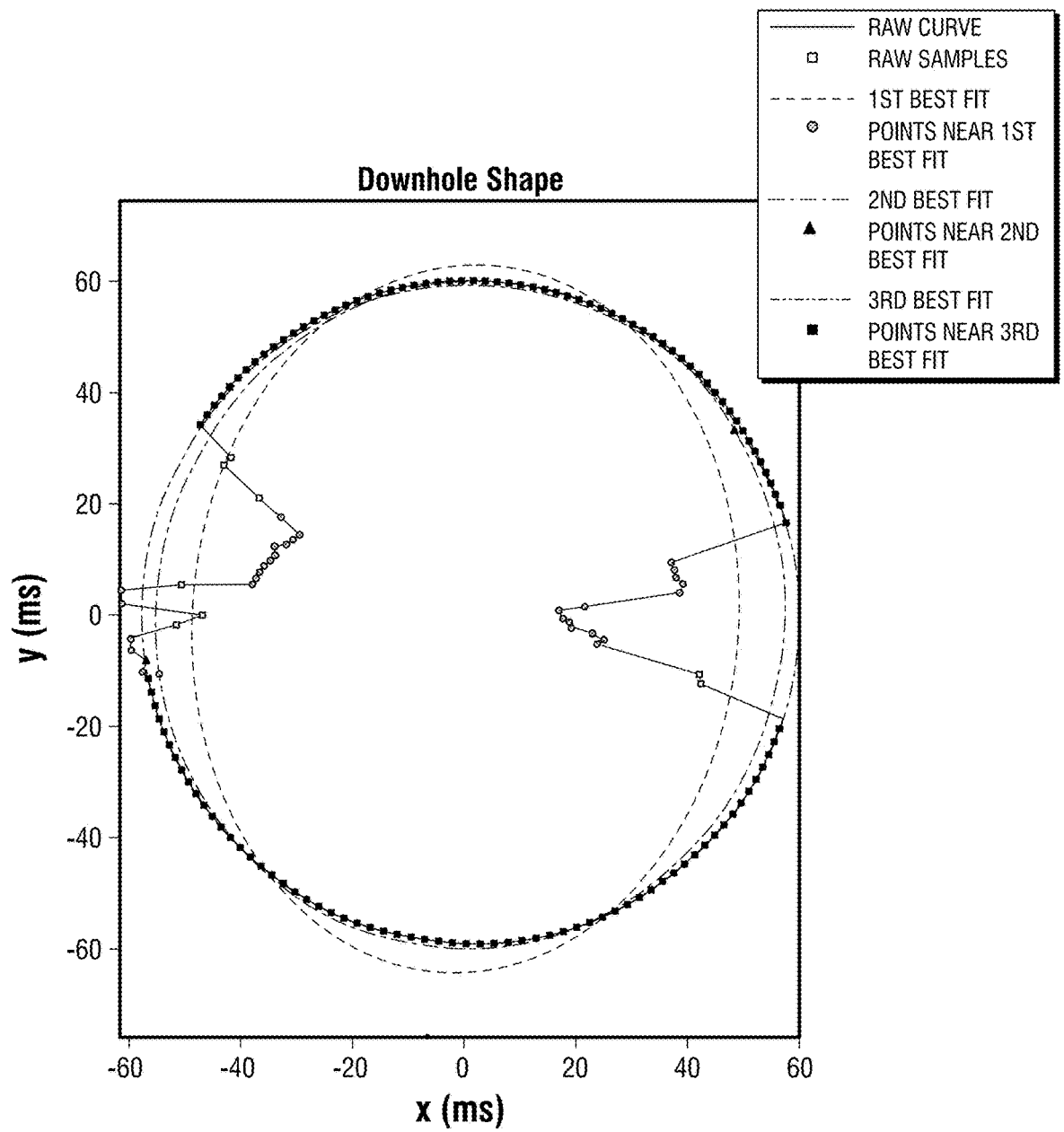
FIG. 13 is a graph of a borehole utilizing the workflow for the fit-and-sort loop.
Figures 17A, 17B, 17C, 17D:
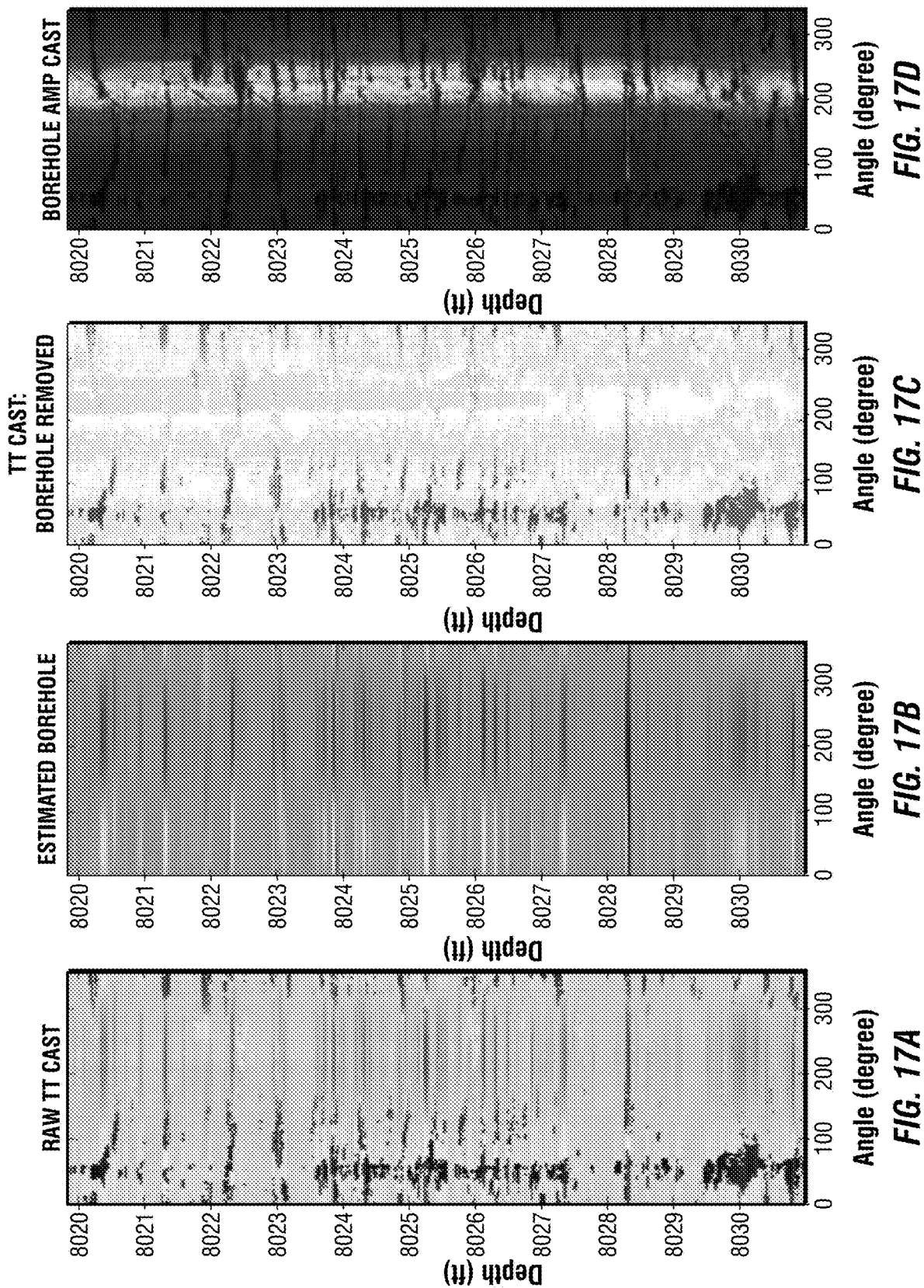
FIG. 17A-17D are logs illustrating removal of impediments with the workflow using the pre-selection before the fit-and-sort loop.

FIG. 13 demonstrates how the ellipse shapes in workflow 1200 (e.g., referring to FIG. 12) for a fit-and-sort loop converge to actual borehole shape. As illustrated, FIG. 13 may operate in some environments where there may be minimal distortion. Although "Fit-and-Sort" approach works well for many cases, it may fail when the distortion is too severe.

FIG. 14 illustrates workflow 1400, which includes step 1402 for pre-selection, to make perform a robust algorithm in the case of severe distortion, as illustrated in FIG. 15. Referring back to FIG. 14, step 1402 for pre-selection bases on some criteria to select a sub-group of measurements that may then be feed them into step 1404 for fit and step 1406 for sort, for a "Fit-and-Sort" loop. As discussed above, step 1404 may implement workflow from FIG. 6. For example, criteria may be smoothness of a borehole, the length of the smooth section, and the curvature angle of the smooth section. In examples, the borehole may be divided into section which may be measured individually.

The pre-selection step based on smoothness may be undertaken by measuring second-order gradient at each measurement in reference to adjacent measurements. A continuous section of low second-order gradients will be ranked by length. Top three or four longest sections will be selected in this pre-selection process.

FIG. 15 illustrate workflow 1400 (e.g., referring got FIG. 14), which shows a borehole shape being found from measurements recorded during measurement operations. In step 1402 (e.g., referring to FIG. 14) pre-selection may pick three sections to enter the "Fit-and-Sort" loop of steps 1402 and 1404. After only three iterations, the ellipse has been established. FIG. 16 illustrates a graph estimation of a borehole without pre-selection. Methods that do not utilize pre-selection are methods currently used in technology and do not use pre-selection. As illustrated in FIG. 16, distorted measurements affect the estimated shape of a borehole. FIGS. 15 and 16 show the performance difference between using pre-selection and no pre-selection for borehole shape estimate.

FIGS. 17A-17D are examples of borehole shape information. By having more accurate borehole shape information, the distorted measurements may be sorted out as features. As illustrated, features may be separated into features outside borehole shape (dented features) and features inside borehole shape (protruding features).

It should be noted that a drilling control measurement system may be utilized to calculate and characterize real-time tool borehole shape and send those results up hole to the driller by means of mud-pulse or wired pipe telemetry. With abundant drilling data using our real time feedback loop measurement system for determining a borehole shape. This may allow an operator to build an artificial intelligent ("AI") drilling optimization and controlling system. Therefore, an AI based drilling automation and optimization system may maximize the drilling efficiency and borehole quality as well as to reduce drilling cost and failures.

It should be understood that, although individual examples may be discussed herein, the present disclosure covers all combinations of the disclosed examples, including, without limitation, the different component combinations, method step combinations, and properties of the system.

Statement 1. A method for identifying a shape of a borehole may comprise disposing a downhole tool into the borehole, wherein the downhole tool comprises at least one transducer; transmitting a pressure pulse from the at least one transducer, wherein the pressure pulse is reflected as an echo; recording the echo with the at least one transducer; producing data points based at least in part on the echo, each data point including a radial distance value and an azimuthal value corresponding to the radial distance value; performing a pre-selection; fitting a geometric shape to a plurality of data points within the borehole; and sorting out at least one of the plurality of data points based at least in part on the shape.

Statement 2. The method of statement 1, wherein the pre-selection is a predicted measurement that conforms at least in part to a criteria.

Statement 3. The method of statements 1 or 2, wherein the criteria is a smoothness of the borehole, a length of the smoothness of the borehole, or a curvature angle of the smoothness of the borehole.

Statement 4. The method of statements 1 to 3, further comprising dividing the borehole into a plurality of sections.

Statement 5. The method of statement 4, further comprising identifying a criteria for each of the plurality of sections.

Statement 6. The method of statement 5, wherein the criteria is a smoothness of the borehole, a length of the smoothness of the borehole, or a curvature angle of the smoothness of the borehole.

Statement 7. The method of any preceding statement, wherein the shape is an ellipse.

Statement 8. The method of statement 7, wherein the plurality of measurements include at least one distorted measurement.

Statement 9. The method of statement 8, further comprising removing the at least one distorted measurement with the sorting out the at least one of the plurality of measurements based at least in part on the geometric shape.

Statement 10. The method of any preceding statement, wherein the geometric shape includes borehole features and wherein the borehole features include a dented feature or a protruding feature.

Statement 11. A system for identifying shape of a borehole comprising: at least one transducer and wherein the at least one transducer is configured to emit a pressure pulse and record an echo; and an information handling system configured to: produce data points based at least in part on the echo, each data point including a radial distance value and an azimuthal value corresponding to the radial distance value; perform a pre-selection; fit a geometric shape to a plurality of data points within the borehole; and sort out at least one of the plurality of data points based at least in part on the shape.

Statement 12. The system of statement 11, wherein the pre-selection is a predicted measurement that conforms at least in part to a criteria.

Statement 13. The system of statements 11 or 12, wherein the criteria is a smoothness of the borehole, a length of the smoothness of the borehole, or a curvature angle of the smoothness of the borehole.

Statement 14. The system of statements 11 to 13, wherein the information handling system is further configured to divide the borehole into a plurality of sections.

Statement 15. The system of statement 14, wherein the information handling system is further configured to identify a criteria for each of the plurality of sections.

Statement 16. The system of statements 15, wherein the criteria is a smoothness of the borehole, a length of the smoothness of the borehole, or a curvature angle of the smoothness of the borehole.

Statement 17. The system of any statements 11 to 16, wherein the shape is an ellipse.

Statement 18. The system of any statements 11 to 17, wherein the plurality of measurements include at least one distorted measurement.

Statement 19. The system of any statements 11 to 18, wherein the information handling system is further configured to remove the at least one distorted measurement with the sorting out the at least one of the plurality of measurements based at least in part on the geometric shape.

Statement 20. The system of any statements 11 to 19, wherein the shape includes borehole features and wherein the borehole features include a dented feature or a protruding feature.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying a shape of a borehole comprising:
   disposing a downhole tool into the borehole, wherein the downhole tool comprises at least one transducer;
   transmitting a pressure pulse from the at least one transducer, wherein the pressure pulse is reflected as an echo;
   recording the echo with the at least one transducer;
   producing a plurality of data points based at least in part on the echo, each data point including a radial distance value and an azimuthal value corresponding to the radial distance value;
   determining a smoothness of one or more sections from a second-order gradient comprising at least a first section of data points and a second section of data points, wherein the first section and the second section are adjacent to each other;
   performing a pre-selection of a geometric shape based at least in part on the smoothness;
   fitting a geometric shape to a plurality of data points within the borehole; and
   sorting out at least one of the plurality of data points based at least in part on the geometric shape.

2. The method of claim 1, further comprising dividing the borehole into a plurality of sections.

3. The method of claim 2, further comprising identifying a criteria for each of the plurality of sections.

4. The method of claim 3, wherein the criteria is a smoothness of the borehole, a length of the smoothness of the borehole, or a curvature angle of the smoothness of the borehole.

5. The method of claim 1, wherein the geometric shape is an ellipse.

6. The method of claim 5, wherein the plurality of data points include at least one distorted data point.

7. The method of claim 6, further comprising removing the at least one distorted data point with the sorting out of the at least one of the plurality of data points based at least in part on the geometric shape.

8. The method of claim 1, wherein the geometric shape includes borehole features and wherein the borehole features include a dented feature or a protruding feature.

9. The method of claim 1, wherein the plurality of data points include at least one distorted data point.

10. The method of claim 9, further comprising removing the at least one distorted data point with the sorting out of the at least one of the plurality of data points based at least in part on the geometric shape.

11. A system for identifying shape of a borehole comprising:
    at least one transducer and wherein the at least one transducer is configured to emit a pressure pulse and record an echo; and
    an information handling system configured to:
      produce a plurality of data points based at least in part on the echo, each data point including a radial distance value and an azimuthal value corresponding to the radial distance value;
      determine a smoothness of one or more sections from a second-order gradient, wherein the second order gradient comprises at least a first section of data points and a second section of data points, and wherein the first section and the second section are adjacent to each other;
      perform a pre-selection of a geometric shape based at least in part on the smoothness of the one or more sections;
      fit a geometric shape to a plurality of data points within the borehole; and
      sort out at least one of the plurality of data points based at least in part on the geometric shape.

12. The system of claim 11, wherein the information handling system is further configured to divide the borehole into a plurality of sections.

13. The system of claim 12, wherein the information handling system is further configured to identify a criteria for each of the plurality of sections.

14. The system of claim 13, wherein the criteria is a smoothness of the borehole, a length of the smoothness of the borehole, or a curvature angle of the smoothness of the borehole.

15. The system of claim 11, wherein the geometric shape is an ellipse.

16. The system of claim 15, wherein the plurality of data points include at least one distorted data point.

17. The system of claim 16, wherein the information handling system is further configured to remove the at least one distorted data point with the sorting out of the at least one of the plurality of measurements based at least in part on the geometric shape.

18. The system of claim 11, wherein a borehole shape includes borehole features and wherein the borehole features include a dented feature or a protruding feature.

19. The system of claim 11, wherein the plurality of data points include at least one distorted data point.

20. The system of claim 19, wherein the information handling system is further configured to remove the at least one data point with the sorting out of the at least one of the plurality of data points based at least in part on the geometric shape.

* * * * *